United States Patent [19]

Havens

[11] Patent Number: 5,235,810
[45] Date of Patent: Aug. 17, 1993

[54] CONDUIT VALVE PROVIDING WIDE NEUTRAL IN A HYDROSTATIC TRANSMISSION

[75] Inventor: Dale I. Havens, Addison, Mich.

[73] Assignee: Tecumseh Products Company, Tecumseh, Mich.

[21] Appl. No.: 952,670

[22] Filed: Sep. 28, 1992

[51] Int. Cl.[5] ............................................. F16D 33/00
[52] U.S. Cl. .......................................... 60/464; 60/465; 60/468; 60/489; 91/498
[58] Field of Search .................. 60/433, 464, 465, 468, 60/489, 494; 91/497, 498

[56] References Cited

U.S. PATENT DOCUMENTS

| | | | |
|---|---|---|---|
| 1,726,481 | 8/1929 | Ferris | 60/489 |
| 3,161,137 | 12/1964 | Thoma | 103/41 |
| 3,165,069 | 1/1965 | Adamek | 60/464 |
| 3,171,255 | 3/1965 | Lauck | 60/468 |
| 3,171,256 | 3/1965 | Lauck | 60/53 |
| 3,451,218 | 6/1969 | Grant | 60/52 |
| 3,609,973 | 10/1971 | Nagano | 60/53 A |
| 3,680,312 | 8/1972 | Forster | 60/53 |
| 4,211,079 | 7/1980 | Saele | 60/433 |
| 4,845,961 | 7/1989 | Okuda | 60/489 |
| 4,856,264 | 8/1989 | Nishimura | 56/10.9 |
| 4,860,540 | 8/1989 | Hayashi | 60/487 |
| 4,899,541 | 2/1990 | Okada et al. | 60/489 |
| 4,899,542 | 2/1990 | Iino | 60/487 |
| 4,905,472 | 3/1990 | Okada | 60/464 |
| 4,907,408 | 3/1990 | Barker | 60/451 |
| 4,962,675 | 10/1990 | Aoi et al. | 74/473 |
| 4,968,227 | 11/1990 | Szulczewski | 417/440 |
| 5,010,733 | 4/1991 | Johnson | 60/453 |
| 5,048,295 | 9/1991 | Hoscheler | 60/461 |
| 5,094,077 | 3/1992 | Okada | 60/436 |
| 5,094,078 | 3/1992 | Nishimura | 60/487 |

Primary Examiner—Edward K. Look
Assistant Examiner—F. Daniel Lopez
Attorney, Agent, or Firm—Baker & Daniels

[57] ABSTRACT

A valve mechanism for a hydrostatic transmission having a variable displacement pump and a motor in fluid communication with each other via a closed-loop fluid system. The valve mechanism provides pressure relief and a wide neutral feature within a predetermined range of movement about a zero displacement or neutral position of the pump. The valve mechanism is variably controlled by and in coordination with the movement of the displacement pump control mechanism from a fully open position through a fully closed position, such that as the pump is shifted into and out of neutral from both a forward and reverse displacement position, the valve mechanism is moved therewith. The valve mechanism constitutes a ring surrounding the conduit and is responsive to the pump control mechanism so as to move concentrically therewith. The ring valve includes bores selectively communicating with respective bores in the fluid system such that the fluid system is in selective communication with a cavity formed in the housing. The bores provide a metered leak path from the fluid system within 3° of neutral in either the forward or reverse displacement positions upon actuation of the pump control mechanism into the same displacement position so as to reduce the pressure within the fluid system during engagement of the transmission. Movement beyond 3° completely closes the valve such that full pressure may be developed within the fluid system.

14 Claims, 4 Drawing Sheets

CONDUIT VALVE PROVIDING WIDE NEUTRAL IN A HYDROSTATIC TRANSMISSION

BACKGROUND OF THE INVENTION

The present invention relates to variable displacement hydrostatic transmissions and, more particularly, to a pressure relief valve providing a wide neutral feature in a hydrostatic transmission.

Generally, hydrostatic transmissions consist of a variable displacement hydraulic pump unit driven by an internal combustion engine of the vehicle, and a fixed displacement hydraulic motor unit connected to the drive train of the vehicle. A closed fluid loop consisting of first and second conduits fluidly connect the pump with the motor. The motor speed is zero when the fluid displacement of the pump is zero, which corresponds to a neutral position. By increasing the fluid displacement of the pump, the pump drives the motor in a direction consistent with the fluid flow direction within the first and second conduits. The fluid displacement of the pump can be in either direction which changes the flow of fluid in the first and second conduits by creating a difference in pressure between the two conduits. Thus, the motor is caused to rotate in a first and second direction corresponding to forward and reverse directions.

Further, the displacement of fluid within the pump is variably controlled by the operator to whereby change the volume of fluid flow within the closed conduit loop between the pump and the motor. Thus, the pump and therefore the output of the motor can variably range from a full reverse position, through a neutral position, to a full forward position.

Such a hydrostatic transmission of the type described above and contemplated for use with the present invention is shown in U.S. Pat. No. 5,078,659 issued to Von Kaler et al., and incorporated herein by reference.

Variable displacement hydrostatic transmissions have come to be utilized in a variety of applications, most notably in lawn and garden tractors. A hydrostatic transmission provides a variable speed drive which is continuously shiftable from a forward to a reverse position, with neutral therebetween. Because the closed conduit loop is pressurized, changes in the displacement of the pump causes abrupt pressure changes in the loop as the fluid displacement of the pump is moved from a neutral position into a forward or reverse position, or from a forward or reverse position into a neutral position. The abrupt pressure change is caused by the reversal of fluid power flow within the conduits during shifting from a forward to a reverse position or vice versa. Also, abrupt pressure changes can occur during initiation of fluid flow within the conduit upon displacement of the pump from the neutral position. The abrupt pressure changes are further magnified by the rate at which the pressure changes are made which correspond to the rate at which the operator moves the pump displacement control.

In addition, the effects of abrupt pressure changes within the conduit loop are more pronounced at low pump displacements versus at high pump displacements. Thus, the pressure changes are more acute when the displacement of the pump is near zero, or near the neutral position.

Such abrupt pressure changes are not desirable in a transmission since they cause lurching of the vehicle as the transmission is engaged from neutral into forward or reverse. Also, abrupt pressure changes cause fatigue of the transmission components as surges of fluid are displaced within the conduits, pump, and motor.

Further, when the transmission is in a neutral position, there may be the tendency of the transmission to "creep" such that the transmission will tend to slightly move in either the forward or reverse direction. This occurs when displacement of the pump is not completely zero, such as can happen if the pump displacement control mechanism is not completely synchronized with the operator control, as well as other causes.

It is thus desirable, both from the standpoint of operator comfort and transmission life, to reduce or eliminate the pressure surges which naturally occur during operation of the hydrostatic transmission. It is also desirable to alleviate creeping by providing a wider and more positive neutral position.

U.S. Pat. No. 3,451,218 issued to Grant utilizes a compensator valve disposed in a conduit connecting the two sides of a hydrostatic loop in order to provide a short circuit between the high and low pressure conduits. The valve is keyed via linkage to the displacement of the pump such that activation of the valve is accomplished with the displacement of the pump.

The prior art has not provided a simple, effective pressure reduction mechanism which does not sacrifice transmission power efficiency.

It is therefore an object of the present invention to reduce the abrupt pressure changes within the conduit loop as the pump displacement is moved into and out of a neutral position.

It is another object of the present invention to provide a wide neutral feature in a hydrostatic transmission within a predetermined range of movement about a neutral pump position.

It is yet another object of the present invention to provide pressure reduction in a hydrostatic transmission and a wide neutral which is coordinated with the movement of the pump displacement control mechanism.

It is still another object of the present invention to provide a wide neutral feature in a hydrostatic transmission which does not sacrifice the full power efficiency performance of the transmission.

SUMMARY OF THE INVENTION

The present invention provides in a hydrostatic transmission, a pressure relief valve mechanism actuated by and coordinated with the pump displacement control mechanism providing a wide neutral action within a predetermined range of movement about a neutral pump displacement position.

In one form thereof, the present invention provides a relief valve for a hydrostatic transmission having a housing defining a chamber therein, a conduit disposed in the chamber and defining a closed loop system, and a variable displacement hydraulic pump disposed on the conduit and in communication with the closed loop system, the pump being continuously variably displaceable between a full reverse position and a full forward position with a neutral position therebetween, with a track ring pivotally disposed about the pump for changing the displacement of said pump. Control means are operably connected to the track ring for controllably moving the track ring, a hydraulic motor disposed on the conduit and in communication with the closed loop system; and valve means disposed on the conduit for equalizing fluid pressure between the conduit and the chamber by variably controlling fluid flow between the conduit and said chamber when the pump is in the neutral displacement position and within a predetermined displacement range about the neutral displacement position, the valve means operably connected to the control means so that fluid flow through the valve means is variably controlled by movement of the control means such that the valve means moves in concurrent coordination with the track ring.

In one form thereof, the present invention provides a pressure relief valve for a hydrostatic transmission having a pump and motor in fluid communication via a conduit defining a wide neutral feature within a predetermined range of movement about a neutral position as a control mechanism for varying the displacement of the pump and operably connected to the valve is shifted to and from both a forward and reverse displacement position. The conduit includes two passages forming a fluid loop between the pump and motor, and two radially extending, generally diametrically opposed bores, each having one end in communication with a respective conduit passage, and another end in selective communication with a cavity defined about the conduit. A ring having two radially extending generally diametrically opposed bores radially surrounds the conduit bores. The ring bores are selectively communicative with the conduit bores as the ring is radially rotated about the conduit thereby forming the relief valve. Rotation of the ring is concentric with the pump displacement control mechanism and provides selective communication with the conduit to vent the fluid from the conduit into the sump when pump displacement is within 3° of neutral displacement.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

Figure 1:
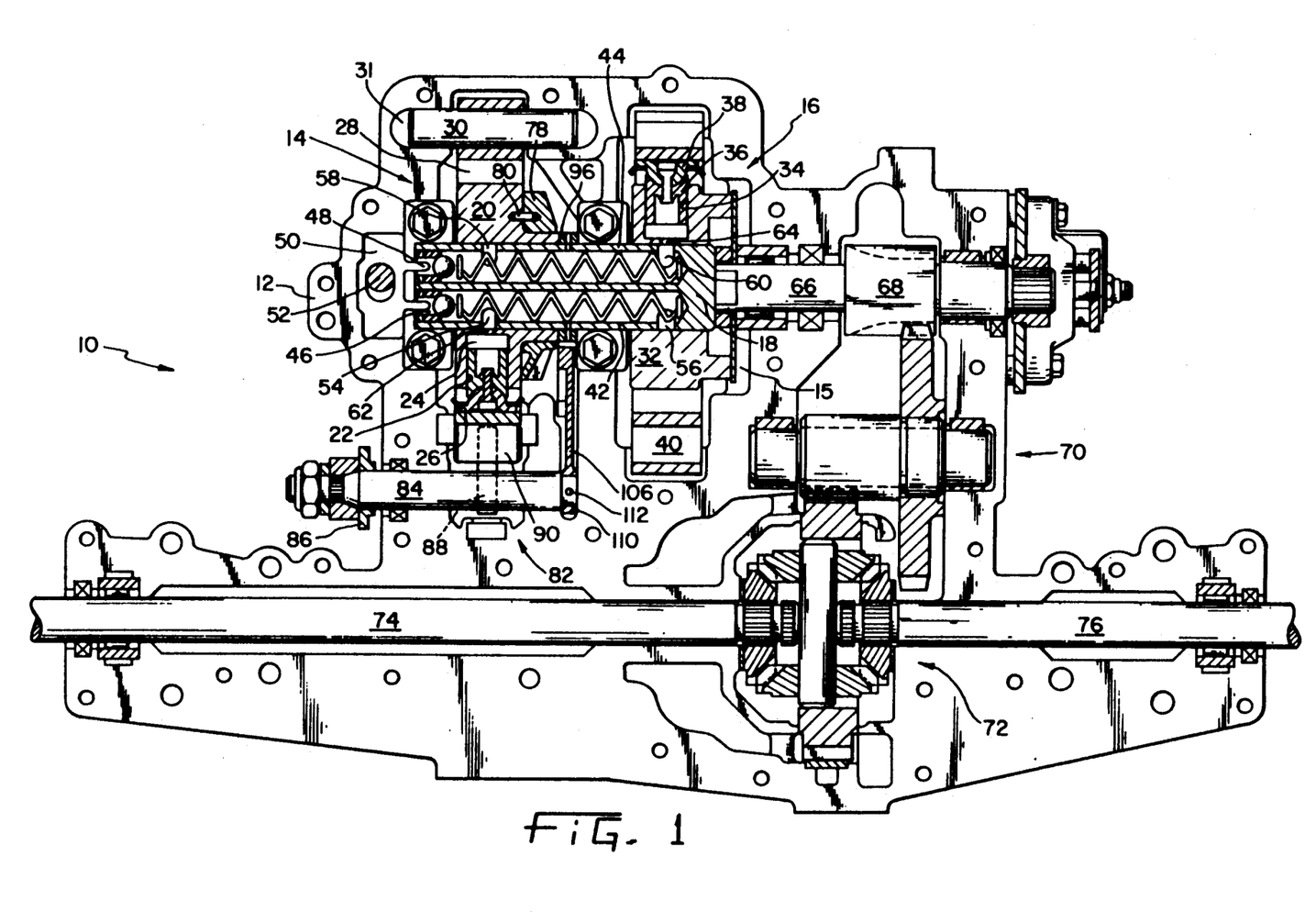
FIG. 1 is a top sectional view of a hydrostatic transaxle, incorporating an embodiment of the present invention.

Referring to FIG. 1, there is shown a typical hydrostatic transaxle (HST) 10 enclosed in a two part housing of which only the lower housing part 12 is shown. HST 10 includes a radial piston type pump 14 fluidly connected to a radial piston type motor 16 via a pintle or conduit 18. The pump, motor, and conduit generally constituting the variable displacement hydrostatic transmission portion of the present hydrostatic transaxle 10. Pump 14, motor 16, and pintle 18 are disposed within a chamber 15 defined by lower housing part 12 and the upper housing part (not shown). Chamber 15 defines a sump region surrounding the transmission portion in which excess oil accumulates or make-up oil for the transmission is retained.

Pump 14 includes a generally annular cylinder block 20 rotatably disposed on pintle 18. Cylinder block 20 has a plurality of radially extending bores, of which only one bore 22 is shown. Reciprocatingly disposed in each bore 22 is a piston 24, each having a corresponding slipper 26. Radially surrounding cylinder block 20 is a pump track ring 28, the inner circumferential surface of which is contacted by slippers 26. A pivot pin 30 is disposed in a recess 31 formed in lower housing part 12 having a counterpart recess (not shown) formed in the upper housing part. Pivot pin 30 axially extends through a bore (not shown) formed in one end of track ring 28 such that as track ring 28 pivots about pivot pin 30 within the confines of the housing cavity, track ring 28 is eccentrically pivotable about pintle 18 in order to variably change the displacement of pump 14.

As described in greater detail hereinbelow in conjunction with the operation of the hydrostatic transmission portion of the HST, the pivoting of pump track ring 28 about pivot pin 30 and pintle 18 is governed by a control mechanism 82. Control mechanism 82 includes a control rod 84 which extends out of housing section 12 and which is rotatable about its longitudinal axis through operator actuated control handle 86. Control handle 86 is fixedly secured to control rod 84 such that movement of control handle 86 in a forward or reverse direction correspondingly rotates control rod 84. A control pin 88 is disposed in control rod 84 transverse to the longitudinal axis thereof and extends into a flange 90 formed as part of pump track ring 28. As control rod 84 is rotated about its longitudinal axis by movement of control handle 86, control pin 90 radially pivots about control rod 84 which pivots pump track ring 28 about pivot pin 30. Thus, through action of control mechanism 82, track ring 28 eccentrically pivots about pintle 18, and depending on the direction of rotation, the pump is displaced through neutral into a forward or a reverse position.

Motor 16 includes a generally annular cylinder block 32 rotatably disposed on pintle 18. Cylinder block 32 has a plurality of radially extending bores, of which only one bore 34 is shown. Reciprocatingly disposed in each bore 34 is a piston 36, each having a corresponding slipper 38. Radially surrounding cylinder block 32 is a motor track ring 40 fixed relative to pintle 18, the inner surface of which is contacted by slippers 38. Motor 16 is fluidly connected to pump 14 via pintle 18 such that fluid pumped into pintle 18 is received by motor 16, while fluid flowing from motor 16 is received by pump 14.

Motor cylinder block 32 is connected to an output shaft 66 such that output shaft 66 rotates therewith. Splined onto shaft 66 is a gear 68 which transmits rotational motion to a gear train 70 connected to a differential 72. Differential 72 transmits the imparted rotational motion to left and right axles 74 and 76 which are drivingly attached to wheels of a vehicle, both of which are not shown.

Pintle 18 includes two fluid conduits or passages 42, 44 each being closed at one end and having a respective check valve 46, 48 disposed in the other end. Check valves 46, 48 are normally closed valves, here shown as spring-biased ball valves, which retain oil within the conduits during operation of the HST but which may be unseated by actuation of an adjacently disposed valve plate 50 via an operator controlled actuator rod 52. When unseated into an open position through actuation of valve plate 50, check valves 46, 48, release the oil under pressure within respective conduits 42 and 44. This allows the transmission to bypass normal operation and permits "freewheeling" of the vehicle without resistance from the HST.

Figure 2:
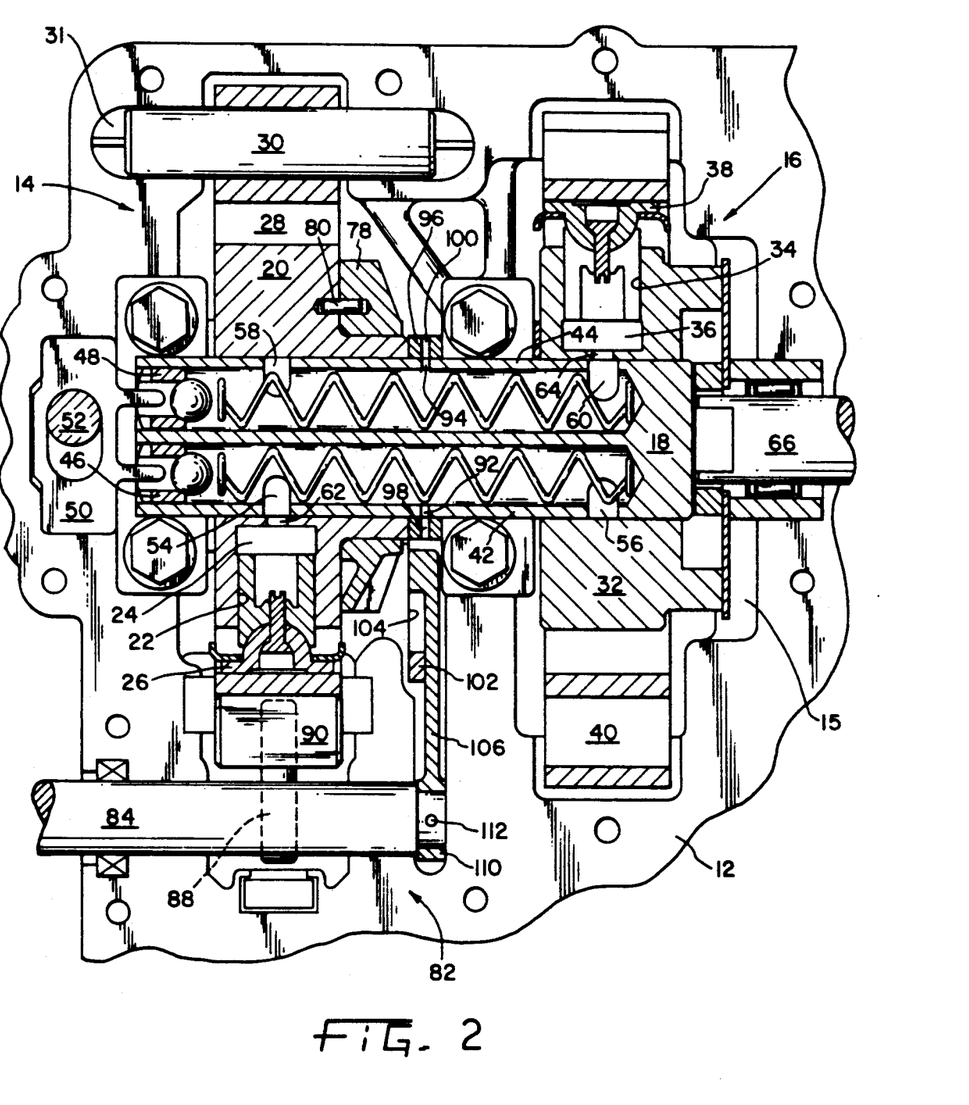
FIG. 2 is an enlarged fragmentary sectional view of the hydrostatic transaxle of FIG. 1.
Figure 3:
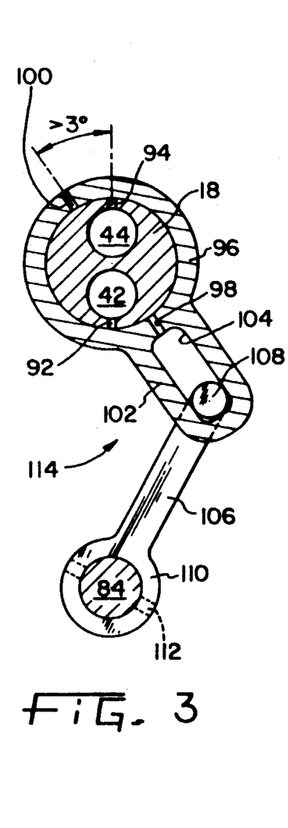
FIG. 3 is a side view of the pintle and valve mechanism showing the ring valve and ring valve controller of the present invention engaged in a fully forward position.

As shown in more detail in FIG. 2, conduit 42 includes two ports 54 and 56 which are respectively disposed in opposite ends of conduit 42 radially inwardly of pump cylinder block 20 and motor cylinder block 32. Conduit 44 includes two ports 58 and 60 which are respectively disposed in opposite ends of conduit 44 radially inwardly of pump cylinder block 20 and motor cylinder block 32. Conduit ports 54 and 58 of respective conduits 42 and 44 are in fluid communication with the pistons of the pump through a plurality of pump cylinder block bores, of which only one pump cylinder block bore 62 is shown, corresponding to the number of pump pistons. Conduit ports 56 and 60 of respective conduits 42 and 44 are in fluid communication with the pistons of the motor through a plurality of motor cylinder block bores, of which only one motor cylinder block bore 64 is shown, corresponding to the number of motor pistons. Thus, pump 14 and motor 16 are fluidly connected via conduits 42 and 44 forming a closed loop fluid system between the pump and the motor.

With particular reference to FIG. 2, pintle 18 further includes two bores 92, 94 which communicate with respective conduits 42, 44 and the exterior of pintle 18. Bores 92 and 94 have a diameter ($\phi$) of preferably 1/16". This particular size diameter permits a suitable amount of fluid from each conduit 42, 44 to be variably vented into chamber 15 as hereinbelow described in connection with the operation of the relief valve mechanism, however, other suitable diameters ($\phi$) can be utilized. Bores 92 and 94 are also preferably disposed diametrically opposed relative pintle 18.

Radially outwardly surrounding pintle 18 circumjacent bores 92 and 94 is a ring 96 having two bores 98 and 100 which, like bores 92 and 94, are disposed preferably diametrically opposed. Bores 98 and 100, in order to correspond to bores 92 and 94, likewise have a $\phi$ of 1/16", but which can be of any suitable diameter, but preferably of the same diameter as bores 92 and 94. Each bore 98 and 100 extends completely through ring 96 such that each bore 98 and 100 permits communication from the radially inner area of ring 96 to the radially outer area of ring 96. Ring 96 is limitedly rotatably positionable about pintle 18, as hereinbelow described, such that ring bores 98 and 100 are variably alignable with bores 92 and 94, respectively. Also, ring 96 is rotatably positionable about pintle 18 such that bores 98 and 100 are not in alignment with bores 92 and 94, respectively. The rotational positioning of ring 96 about pintle 18 such that bores 98 and 100 are in selective communication with respective bores 92 and 94 is accomplished in coordinated conjunction with the positioning or rotational displacement of pump track ring 28 through concentric motion therewith, as described in greater detail hereinbelow, through movement of control rod 84. Thus, ring 96 with its bores 98 and 100, along with bores 92 and 94 of respective conduits 42 and 44 forms a valve for variably venting fluid from conduits 42 and 44 into chamber 15.

Radially projecting from ring 96 is an extension 102 having an open slot 104 into which extends actuator flange 108 of an actuator arm 106. Actuator arm 106 also includes a connection ring 110 which radially outwardly surrounds an end of control rod 84, and which is fixed to control rod 84 via a connection pin 112. Thus, ring 96 with its associated bores 98 and 100, ring extension 102 and its associated slot 104, actuator arm 106 with its associated actuator flange 108 and connection ring 110, along with control rod 84, forms relief valve assembly 114 of the present invention.

Figures 8, 9:
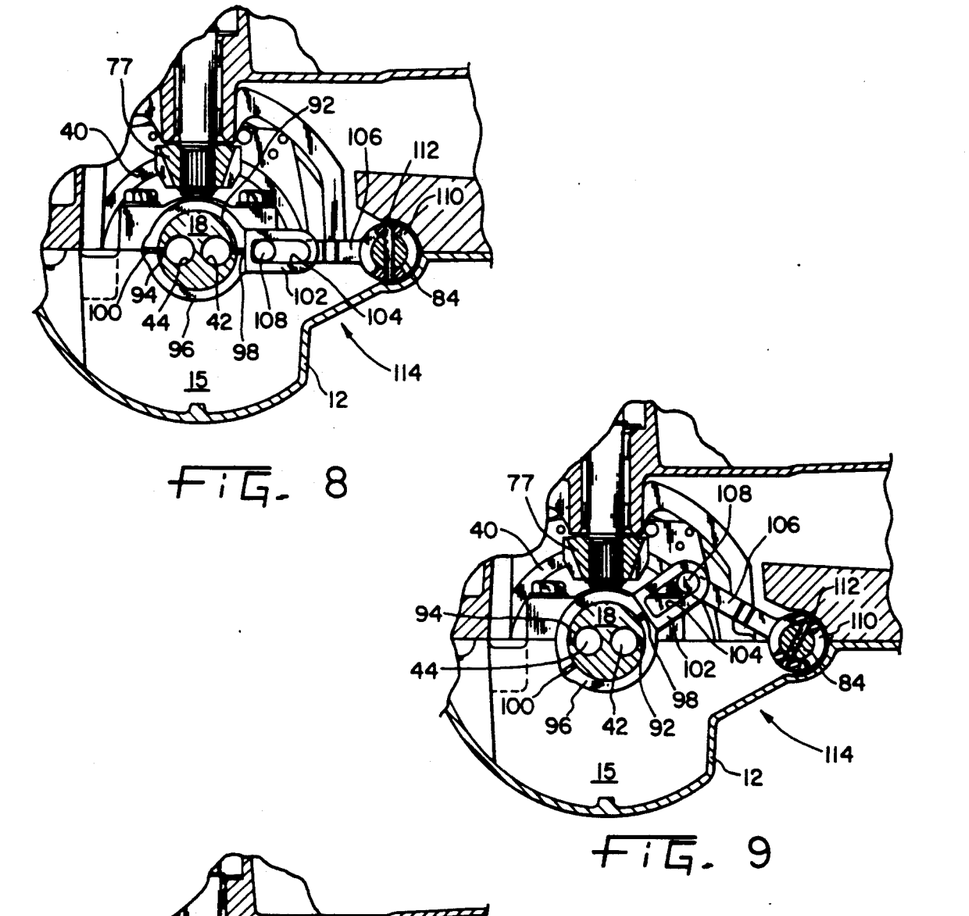
FIG. 8 is a fragmentary sectional view of the hydrostatic transaxle showing the valve mechanism in a neutral position.
FIG. 9 is a fragmentary sectional view of the hydrostatic transaxle showing the valve mechanism in a fully forward position.
Figure 10:
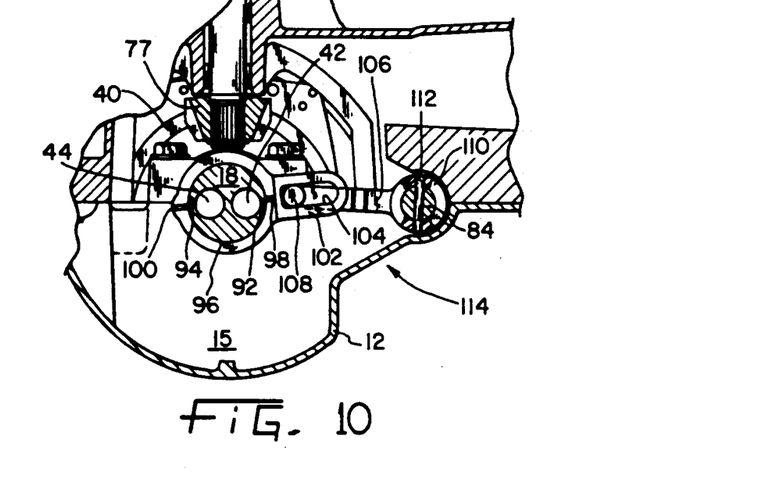
FIG. 10 is a fragmentary sectional view of the hydrostatic transaxle showing the valve mechanism in a partially forward position.

Actuator arm 106 is fixed to an end of control rod 84 such that as control rod 84 is rotated about its longitudinal axis, actuator arm 106 rotates therewith. As best shown in FIGS. 8-10, as actuator arm 106 is caused to rotate by concurrent rotation of control rod 84, actuator flange 108 slides within extension slot 104 which causes ring 96 to radially rotate about pintle 18. Since extension slot 104 limits the movement of actuator flange 108, and actuator flange 108 is operably connected to control rod 84, the length of extension slot 104 permits control rod 84 to rotate through its maximum limits which are defined by the full forward and full reverse positions of pump track ring displacement in order that pump displacement will not be consequently limited.

Figure 4:
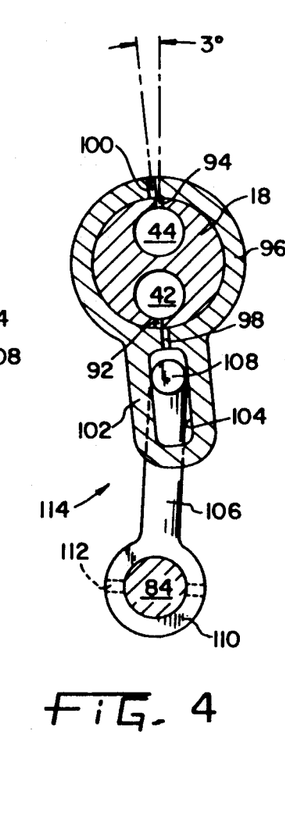
FIG. 4 is a side view of the pintle and valve mechanism showing the ring valve and ring valve controller of the present invention engaged in a partially forward position.
Figure 5:
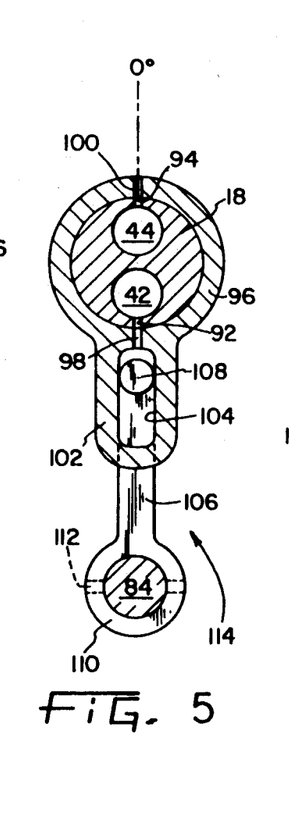
FIG. 5 is side view of the pintle and valve mechanism showing the ring valve and ring valve controller of the present invention in a neutral position.
Figure 6:
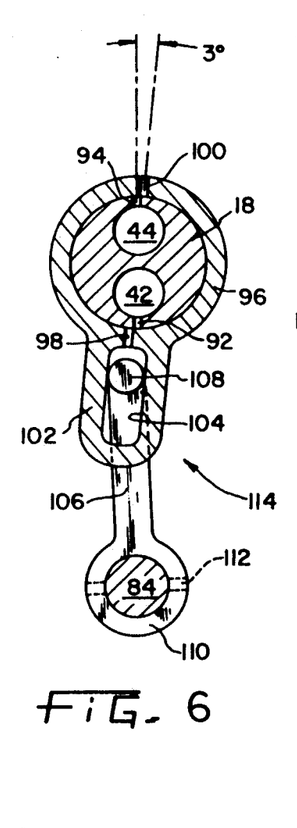
FIG. 6 is side view of the pintle and valve mechanism showing the ring valve and ring valve controller of the present invention engaged in a partially reverse position.
Figure 7:
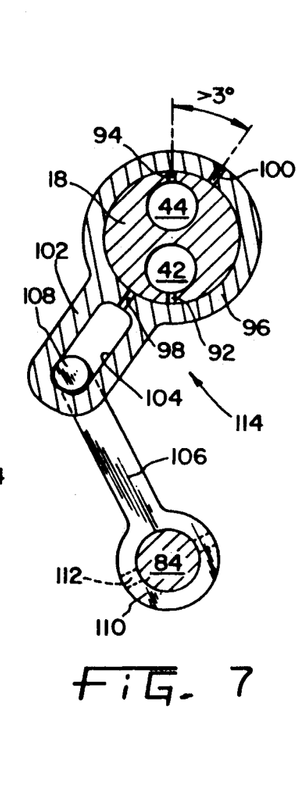
FIG. 7 is side view of the pintle and valve mechanism showing the ring valve and ring valve controller of the present invention engaged in a fully reverse position.

With reference to FIGS. 3-7, there is shown the valve mechanism 114 in various positions about pintle 18 corresponding to various pump displacement positions, depicting the valving action of the structure. FIG. 5 shows valve mechanism 114 when pump displacement is zero which corresponds to a neutral position. Additional reference may be made to FIG. 8 which likewise shows the positioning of valve mechanism 114 when pump displacement is zero. Bores 92, 94 and 98, 100 are in respective alignment, denoted by 0° of relative movement between the bores, providing total unrestricted communication between conduits 42, 44 and chamber 15 in which the mechanism is disposed. Thus, when the transmission is in neutral, fluid within conduits 42, 44 is vented into chamber 15, and fluid pressure is dissipated. From a neutral position into either a forward or reverse displacement position, and vice versa, ring 96 is caused to rotate in conjunction with control rod 84 and thus pump track ring 28. In this case bores 98, 100 arcuately rotate away from respective bores 92, 94 thereby continuously decreasing the amount of fluid which is vented through the valve structure. This effectively allows the buildup of full pressure within conduits 42, 44, by gradually closing the valve. As depicted in FIGS. 4 and 6, when ring 96 is rotated to 3° respectively corresponding to either the forward or reverse pump displacement position, bores 98, 100 are no longer in alignment with bores 92, 94. Thus, valve mechanism 114 effectively shuts off fluid flow from conduits 42, 44 wherein full pressure may be developed within the conduits. FIG. 10 further shows valve mechanism 114 when pump displacement is gradually increasing in the forward displacement position or direction. As further depicted in FIGS. 3 and 7, when pump displacement is greater than 3°, respectively either in the forward or reverse pump displacement positions, valve mechanism 114 completely shuts off fluid flow from conduits 42, 44 into chamber 15. Thus, full power is developed within the transmission. FIG. 9 depicts valve mechanism 114 corresponding to the full forward pump displacement position.

As the pump displacement is changed from full forward or reverse towards neutral, bores 98, 100 become communicative with bores 92, 94 upon reaching 3° from neutral. Thus, as the vehicle slows down, pressure buildup is reduced by venting fluid from conduits 42, 44, thereby assuring smooth transmission operation.

It should be noted that this structure, while preventing pressure buildup and surges within the hydraulic system, also provides a wide neutral feature. Since fluid is vented from the conduits and the pressure buildup is gradual, a greater movement of the control lever is required to engage the vehicle in the direction of drive.

The general operation of the HST 10 along with the relief valve mechanism will now be described. With particular reference to FIGS. 1 and 2, rotational energy for HST 10 is provided by an internal combustion engine (not shown) which is connected to an input shaft (not shown) of the HST via a belt and pulley arrangement (not shown). The input shaft extends through the upper transaxle housing (not shown) terminating in a pinion gear 77 (see FIGS. 8-10) which meshes with a bevel gear 78. Bevel gear 78 is fixed to pump cylinder block 20 by gear pin 80 such that rotational energy imparted to bevel gear 78 as described hereinabove rotates pump cylinder block 20 about pintle 18. Rotation of pump cylinder block 20 rotates pump pistons 24 within pump cylinder block bores 22. Pump piston slippers 26 which contact the inner periphery of pump track ring 28 are guided by pump track ring 28 such that the position of pump track ring 28 about pintle 18 determines the amount of fluid pressure developed by pump pistons 24 and the rotational direction of travel of motor cylinder block 32. The rotational direction of travel of motor cylinder block 32 and its relative speed determined by the fluid pressure in the respective conduits 42, 44, determines the output drive speed of the vehicle.

When the operator desires to increase or decrease the forward or reverse speed of the vehicle, or the operator desires to move the vehicle into or out of neutral from forward or reverse, the operator moves control handle 86 causing rotation of control rod 84 which rotates pump track ring 28 to change the displacement of pump 14. The motor speed is zero when the fluid displacement of pump 14 is zero, which corresponds to a neutral position of pump track ring 28. By increasing the fluid displacement of the pump by rotation of pump track ring 28 through movement of control rod 84 by control handle 86, pump 14 drives motor 16 in a direction consistent with the fluid flow direction within conduits 42, 44. The fluid displacement of pump 14 can be in either direction which changes the flow of fluid in conduits 42, 44 by creating a difference in pressure between the two conduits. Thus, motor 16 is caused to rotate in a first and second direction corresponding to forward and reverse directions.

Rotation of pump track ring 28 about pintle 18 through rotation of control rod 84 causes concurrent rotation of ring 96 about pintle 18 concentric with pump track ring 28. In a neutral position, as depicted in FIG. 8, bores 98, 100 of ring 96 are in full communication with bores 92, 94 of conduits 42, 44. In this position, fluid from conduits 42, 44 vent into chamber 15. Thus, any fluid flow within conduits 42, 44 whether from pressure developed by pump track ring 28 being out of alignment with a "true" neutral position, or from residual pressure currents within conduits 42, 44 will not effect motor 16 so as to cause rotation. When the operator wishes to move the vehicle, either in a forward or reverse direction, control handle is moved accordingly to cause corresponding rotation of control rod 84 and thus pump track ring 28. This changes the displacement of pump 14 in order to effect a change in the output of motor 16. The pressure surges created within conduits 42, 44 by the engagement of pump 14 into a drive position from a neutral position, are reduced through venting of fluid from conduits 42, 44 by valve mechanism 114. However, the greater the displacement of pump 14, the less fluid is vented from conduits 42, 44 since ring 96 correspondingly shuts off fluid communication between conduits 42, 44 and chamber 15. At 3° from the neutral position in either forward or reverse, fluid communication is completely shut off. Return of pump displacement into a neutral position causes conduits 42, 44 to be in fluid communication with chamber 15 at 3° and less, thus allowing fluid to vent therefrom.

Thus, low power pressure surges within the two conduits are significantly reduced by venting fluid from the conduits during start up of the vehicle from neutral into forward or reverse, or from forward or reverse into neutral. Because fluid pressure is reduced during pump displacement, a greater latitude of movement of control handle 86 is required before the vehicle is engaged in a drive position thus giving the transmission a wide neutral. By providing the wide neutral feature according to the present invention, it is possible to eliminate the dump valve comprising plate 50, rod 52 and the associated seal (not shown).

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A hydrostatic transmission comprising:
    a housing defining a chamber therein, said chamber containing a hydraulic fluid;
    a conduit disposed in said chamber and defining a closed loop hydraulic system, said conduit including a port therein for communication between said closed loop hydraulic system and said chamber;

a variable displacement hydraulic pump connected to said conduit and in communication with said closed loop system, said pump being continuously variably displaceable between a full reverse position and a full forward position with a neutral position therebetween;

a track ring pivotally disposed about said pump for changing the displacement of said pump;

control means operably connected to said track ring for controllably moving said track ring;

a hydraulic motor connected to said conduit and in communication with said closed loop system; and a sleeve having an opening therethrough, and said sleeve encircling said conduit and overlying said conduit port, said sleeve operably connected to said control means wherein said sleeve moves in concurrent coordination with said track ring such that said sleeve opening is in selective communication with said conduit port for bleeding off fluid from said conduit into said chamber only when said pump is in a neutral displacement position and within a narrow predetermined displacement range about the neutral displacement position to thereby provide a wide neutral control range.

2. The hydrostatic transmission of claim 1, wherein said sleeve allows variable fluid communication between said conduit and said chamber within about 3° of the neutral displacement position in either the forward or reverse displacement positions, and shuts off fluid communication therebetween beyond 3°.

3. The hydrostatic transmission of claim 1, wherein said sleeve allows diminishing variable fluid communication between said conduit and said chamber as said pump displacement is moved from the neutral displacement position through about 3° into either the forward or reverse displacement position, and shuts off fluid communication therebetween beyond about 3°.

4. The hydrostatic transmission of claim 1, wherein said sleeve comprises:

a rotatable ring radially outwardly surrounding said conduit adjacent said pump; and an arm radially extending from said ring, said arm connected to said control means for rotating said sleeve about said conduit in response to movement of said control means.

5. The hydrostatic transmission of claim 4, wherein said conduit port and said sleeve opening are both 1/16" in diameter.

6. A hydrostatic transmission comprising:

a housing defining a chamber therein;

a conduit disposed in said chamber, said conduit including a first fluid passage and a second fluid passage, said first and second fluid passages defining a closed loop fluid system;

a first port disposed in said conduit and in fluid communication between said first fluid passage and said chamber;

a second port disposed in said conduit and in fluid communication between said second fluid passage and said chamber;

a variable displacement hydraulic pump connected to said conduit and in fluid communication with said first and second fluid passages, said pump being continuously variably displaceable between a full reverse position and a full forward position with a neutral position therebetween;

a track ring disposed about said pump, said track ring pivotably operable to effect changes in pump displacement;

control means operably connected to said pump track ring for pivotably controlling said track ring;

a hydraulic motor connected to said conduit and in fluid communication with said first and second fluid passages; and a sleeve having third and fourth ports therethrough, said sleeve encircling said conduit and interposed between said first and second ports and said chamber, said sleeve operably connected to said control means so that said sleeve moves in concurrent coordination with said control means and said track ring such that said third and fourth ports are in selective variable fluid communication with said first and second ports respectively for bleeding off fluid from said conduit into said chamber only when said pump is in the neutral displacement position and within a narrow predetermined displacement range about the neutral displacement position to thereby provide a wide neutral control range.

7. The hydrostatic transmission of claim 6, wherein said sleeve comprises:

a rotatable ring radially outwardly surrounding said conduit and said first and second ports disposed adjacent said pump, said ring rotatable about said conduit such that said third and fourth ports are in variable selective fluid communication with said first and second ports respectively.

8. The hydrostatic transmission of claim 7, wherein said first and second ports are disposed in said conduit diametrically opposed, and said third and fourth ports are disposed in said ring diametrically opposed.

9. The hydrostatic transmission of claim 6, wherein said first, second, third, and fourth ports each have a diameter of 1/16".

10. The hydrostatic transmission of claim 6, wherein said sleeve allows diminishing variable fluid communication between said first and second passages and said chamber as said pump is displaced from the neutral displacement position through about 3° into either the forward or reverse displacement position, and shuts off fluid communication therebetween beyond 3°.

11. The hydrostatic transmission of claim 6, wherein said sleeve allows variable communication between said conduit and said chamber within about 3° of the neutral displacement position in either the forward or reverse displacement positions, and shuts off fluid communication therebetween beyond 3°.

12. A hydrostatic transmission with a bypass valve having a housing defining a chamber therein, a conduit having a first and second fluid passage, a variably displaceable hydraulic pump connected to said conduit and in communication with said first and second fluid passages, said pump being continuously variably displaceable between a full reverse position and a full forward position with a neutral position therebetween, a track ring disposed about said pump, said track ring pivotably operable to effect changes in pump displacement, control means operably connected to said pump track ring for pivotably controlling said track ring, and a motor connected to said conduit and in fluid communication with said first and second fluid passages, the relief valve comprising:

first and second ports in said conduit for communication between said first and second fluid passages and said chamber; and a ring rotatably radially outwardly encircling said conduit, said ring including third and fourth ports adapted for fluid communication with said first and second ports respectively as said ring is rotated for variably permitting fluid to bleed from said first and second passages into said chamber when said pump is in the neutral displacement position and within a predetermined displacement range about the neutral displacement position, said ring being operably connected to said control means such that said control means concentrically rotates said ring in concurrent conjunction with said track ring such that said third and fourth ports are in full communication with said first and second ports when said pump displacement is in a neutral position and said third and fourth ports are in variably diminishing fluid communication with said first and second ports when said pump displacement is rotated from a neutral position into either a forward or reverse position until said pump is displaced from the neutral position by about 3° when fluid communication ceases to thereby provide a wide neutral control range.

13. The hydrostatic transmission of claim 12, wherein said first and second ports are disposed in said conduit diametrically opposed, and said third and fourth ports are disposed in said ring diametrically opposed.

14. The hydrostatic transmission of claim 12, wherein said first, second, third, and fourth ports each have a diameter of 1/16″.

* * * * *